US005154973A

United States Patent [19]

Imagawa et al.

[11] Patent Number: 5,154,973

[45] Date of Patent: Oct. 13, 1992

[54] COMPOSITE MATERIAL FOR DIELECTRIC LENS ANTENNAS

[75] Inventors: Shunjiro Imagawa; Jun Harada; Hiroshi Nagakubo; Kazunari Kawabata; Hideaki Yamada, all of Nagaokakyo, Japan

[73] Assignee: Murata Manufacturing Co., Ltd., Japan

[21] Appl. No.: 624,717

[22] Filed: Dec. 4, 1990

[30] Foreign Application Priority Data

Dec. 7, 1989 [JP] Japan ................................. 1-320110

[51] Int. Cl.⁵ ................................................ B32B 5/16

[52] U.S. Cl. .................................... 428/325; 428/402; 428/411.1; 428/412; 428/413; 428/423.1; 428/447; 428/480; 428/500; 428/521; 428/524

[58] Field of Search ............ 428/325, 327, 402, 411.1, 428/412, 413, 423.1, 447, 480, 500, 521, 524

[56] References Cited

U.S. PATENT DOCUMENTS 4,769,646 9/1988 Raber ................................. 343/753

FOREIGN PATENT DOCUMENTS 2204588 5/1987 United Kingdom .

*Primary Examiner*—Edith L. Buffalow

*Attorney, Agent, or Firm*—Ostrolenk, Faber, Gerb & Soffen

[57] ABSTRACT

This invention is to provide a composite material for dielectric lens antennas which contains 3–70 percent by volume of a high dielectric constant ceramic and 30–97 percent by volume of a macromolecular material. At this time it is desirable that the mean particle diameter of the high dielectric constant ceramic is 1–50 μm. It is also preferable that the macromolecular material is a thermoplastic macromolecular material. A dielectric lens is made of this composite material for the dielectric lens antennas. Further, the dielectric lens antenna is preferably produced forming a matching layer on the dielectric lens surface.

9 Claims, 1 Drawing Sheet

COMPOSITE MATERIAL FOR DIELECTRIC LENS ANTENNAS

FIELD OF THE INVENTION

This invention relates to a composite material for dielectric lens antennas.

DESCRIPTION OF THE PRIOR ART

Ceramic dielectrics or macromolecular materials, for example, have been used for the conventional dielectric lens antennas. These materials have been formed into lenses to produce the dielectric lens antennas.

However, when the ceramic dielectric material is used for the dielectric lens antennas, many processes such as calcination, comminution, granulation, molding and baking are necessary, thus requiring long process times and also increasing a manufacturing cost. Further there are some problems of deficiencies in moldability and workability when the ceramic dielectric is used, and it is difficult to form complex moldings. The dielectric lens antenna is usually used outdoors and liable to break or crack due to shock.

When the macromolecular material is used for the dielectric lens antennas, even if the material has a good high frequency characteristic, its dielectric constant is about 4. But the dielectric constant of 4–30 is necessary for the dielectric lens antenna materials. When the dielectric constant is adjusted by using these macromolecular materials, reducing the dielectric constant is easily attained by, for example, foaming the macromolecular materials, but increasing the dielectric constant is very difficult.

Sometimes a composite material of the high dielectric constant ceramic and the macromolecular material has been used for the dielectric lens antennas, and the macromolecular material has played a role as a binder for improving workability and shock resistance of the antenna material. In order to improve an antenna gain characteristic of the dielectric lens antenna, it is required to increase a mechanical quality factor (Q value) in a high frequency range, but the conventional composite material has contained a relatively small amount of the high dielectric constant ceramic, thus a large mechanical quality factor could not be obtained.

SUMMARY OF THE INVENTION

Therefore, it is a principal object of the present invention to provide a dielectric lens antenna composite material which can afford a dielectric lens antenna having a high dielectric constant by controlling the dielectric constant and superior moldability and workability and further good shock resistance.

It is another object of the invention to provide a dielectric lens antenna composite material which can afford a dielectric lens antenna having a large mechanical quality factor in a high frequency range in addition to the above object.

This invention provides a dielectric lens antenna composite material which contains 3–70 percent by volume of a high dielectric constant ceramic and 30–97 percent by volume of a macromolecular material.

The mean particle diameter of the high dielectric constant ceramic is preferably selected to 1–50 μm in the above compositions.

It is also preferable that the macromolecular material is a thermoplastic material and its mechanical quality factor is more than 150.

The dielectric constant is varied by changing a mixing ratio of the high dielectric constant ceramic and the macromolecular material. Further flexibility is caused by using the macromolecular material and injection molding becomes practicable by especially using the thermoplastic macromolecular material.

Further, the dielectric characteristic of the dielectric lens antenna composite material is stabilized by using the high dielectric constant ceramic having a specified mean particle diameter.

In addition, decrease in the antenna gain is minimized by using the thermoplastic macromolecular material having a mechanical quality factor more than 150.

According to the invention the dielectric constant is simply varied by changing a mixing ratio of the high dielectric constant ceramic and the macromolecular material thus the dielectric lens antenna having a high dielectric constant can be obtained.

Further, because of the flexibility of the macromolecular material the dielectric lens antenna can be manufactured, with the injection molding method, by using the dielectric lens antenna composite material and also the dielectric lens antenna having good shock resistance can be obtained through a simple process. In addition, having good moldability, the dielectric lens antenna composite material can be formed into a complex shape dielectric lens antenna.

Still further a stabilized dielectric characteristic can be obtained by using the high dielectric constant ceramic having a specified mean particle diameter of 1–50 μm. Therefore, a stabilized index of refraction may be obtained by using this dielectric lens antenna composite material, thereby a stabilized antenna characteristic may be attained.

Further, an antenna gain characteristic of the dielectric lens antenna can be improved by using a selected thermoplastic macromolecular material having a mechanical quality factor more than 150 in a high frequency range.

The above and other objects, features, aspects and advantages of the invention will become more apparent from the detailed description of the following embodiments with reference to the accompanying drawings.

DESCRIPTION OF THE PREFERRED EMBODIMENTS

Figure 1:
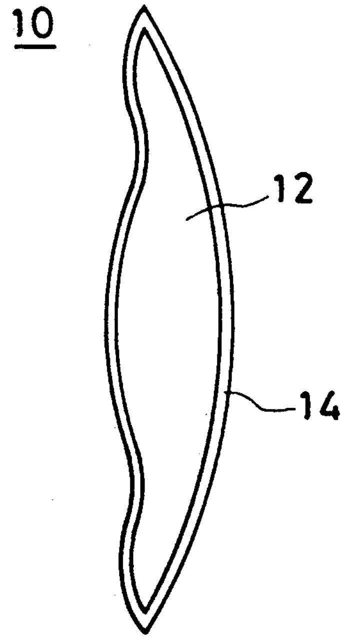
FIG. 1 is an illustrated view showing one example of dielectric lens antennas using a dielectric lens antenna composite material according to the invention.

FIG. 1 is an illustrated view showing one example of the dielectric lens antennas using a dielectric lens antenna composite material according to the invention. This dielectric lens antenna 10 includes a dielectric lens 12. A mixture of a high dielectric constant ceramic and a macromolecular material is used as a dielectric lens 12 material. The high dielectric constant ceramics include, for example, $CaTiO_3$, $SrTiO_3$, $BaO$-$Nd_2O_3$-$TiO_2$, $BaTiO_3$ and ZnO. The macromolecular materials include thermo setting resins such as epoxy resin, urethane resin, phenol resin, silicone resin, melamine resin, and unsaturated polyester resin and thermoplastic resins such as polypropylene, polystyrene, polybutylene terephthalate, polyphenylene sulfide, polycarbonate and polyacetal, and rubbers such as polyisoprene rubber, polybutadien rubber, nitrile rubber, and ethylene-propylene rubber, but are not limited to the above materials.

The mixing ratio of the high dielectric constant ceramic and the macromolecular material is set within the range of 3–70 percent by volume of the high dielectric constant ceramic and 30–97 percent by volume of the macromolecular material. This is owing to the fact that kneadability and moldability become substantially uncontrollable when the percent by volume of the high dielectric constant ceramic exceeds 70%, that is, the percent by volume of the macromolecular material is less than 30%. Further the reason why the above compositions are specified is that the dielectric constant is almost the same as that of a material composed of only the macromolecular material and thinning the dielectric lens becomes unpracticable when the percent by volume of the high dielectric constant ceramic is less than 3%, that is, the percent by volume of the macromolecular material is more than 97%. The surface of the dielectric lens 12 is provided with a matching layer 14 to reduce reflection of waves at the lens surface when necessary. The dielectric constant of the matching layer 14 is set at the square root of the dielectric constant of the dielectric lens 12 or a value near the square root. The thickness of the matching layer 14 is set at ¼ of the wavelength of the desired microwave.

As one experimental example, a dielectric lens antenna composite material which is composed of $CaTiO_3$ and an epoxy resin material was produced. A mixture of epoxy resin, a curing agent and accelerating agent was used as an epoxy resin material. In this experimental example, YUKA SHELL EPOXY KABUSHIKIKAISHA's Epikote 828 as the epoxy resin, New Japan Chemical Co., Ltd.'s MH-700 as the curing agent, and Daito Sangyo Co., Ltd.'s HD-ACC-43 as the accelerating agent were used. The epoxy resin material was made by mixing these epoxy resin, curing agent and accelerating agent in the ratio by weight of 100:86:1.

The dielectric lens antenna composite materials were made by mixing $CaTiO_3$ and the above epoxy resin material in percent by volume shown in Table 1. The dielectric constants $\epsilon r$ at 12 GHz of these dielectric lens antenna composite materials were measured and the data is shown in Table 1. As can be seen from Table 1, the dielectric constant of the dielectric lens antenna composite material can be easily varied by changing a mixing ratio of the high dielectric constant ceramic and the macromolecular material.

The dielectric lens antennas were made by using these dielectric lens antenna composite materials. First, 53% by volume of $CaTiO_3$ and 47% by volume of the above epoxy resin material were mixed and after the mixture was deformed, it was injected into a metal mold. Then it was cured for 4 hours at 120° C. and gradually cooled and taken out from the metal mold to finish the dielectric lens 12.

Further, a matching layer 14 was formed on the dielectric lens 12 surface. As a matching layer 14 material, 13% by volume of $CaTiO_3$ and 87% by volume of the above epoxy resin material were mixed and used. The mixture was injected into a metal mold and cured to form the matching layer 14 of 3.5 mm on the above dielectric lens 12 surface. The antenna gain of the dielectric lens antenna 10 thus obtained was measured by using a measuring instrument of FIG. 2 utilizing waves from communication satellites. This measuring instrument 20 includes a change-over switch 22 and one change-over terminal of the switch 22 is connected with a standard antenna (horn antenna) 24. The other change-over terminal of the change-over switch 22 is connected with the dielectric lens antenna 10 made by using the above method. The common terminal of the change-over switch 22 is connected to converter 26. The converter 26 is connected to a modulated component elimination circuit 28. The modulated component elimination circuit 28 is connected to a reference antenna 30. The gain of the dielectric lens antenna 10 was measured in this manner. At this time, the diameter of the dielectric lens antenna was 300 mm.

As a result the antenna gain of the dielectric lens antenna having no matching layer was 23 dB, while the antenna gain of the dielectric lens antenna having a matching layer was 26 dB.

As can be seen from these experiments, the dielectric constant of the dielectric lens antenna can be adjusted with ease by changing the mixing ratio of the high dielectric constant ceramic and the macromolecular material, and the dielectric lens antenna with a high dielectric constant can be made. Further, because of flexibility of the macromolecular material, the dielectric lens antenna using this dielectric lens antenna composite material can obtain improved shock resistance. Still further, usage of this dielectric lens antenna composite material can bring greatly improved moldability and workability as compared with usage of the conventional material composed of an only ceramic dielectric, thereby shortening a manufacturing process of the dielectric lens antenna and thus reducing its manufacturing cost.

In order to stabilize an antenna gain characteristic, it is preferable that the mean particle diameter of the high dielectric constant ceramic is set at 1–50 μm. The reason why the mean particle diameter is specified is that when the mean particle diameter is less than 1 μm, the dielectric constant decreases and the designed dielectric constant can not be obtained. When a large amount of the high dielectric constant ceramic is added, because of its small mean particle diameter, viscosity of the dielectric lens antenna composite material increases, thereby causing a problem of moldability.

Further, when the mean particle diameter exceeds 50 μm, the dielectric constant increases and the designed dielectric constant can not be obtained, and when the high dielectric ceramic is mixed with the macromolecular material, because of a large mean particle diameter of the former, the high dielectric constant ceramic settles, thus causing inhomogeneity of the dielectric lens antenna composite material.

As an experimental example, polybutylene terephthalate and $CaTiO_3$ powder having the mean particle diameter of Table 2 were mixed to produce the dielectric lens antenna composite material. First these materials were mixed in the ratio by volume of 3:1 and kneaded by two rolls which were heated at 230°–240° C. Then it was cooled and pelletized to form samples for measurement. The dielectric constants $\epsilon r$ of these samples were measured at 12 GHz and the data is shown in Table 2. The mean particle diameter of $CaTiO_3$ powder was measured with the laser scattering method, and $D_{50}$-value was employed as the mean particle diameter.

As can be seen from Table 2, high dielectric constants can be obtained by using the composite materials made by mixing the high dielectric constant ceramic and the macromolecular material. The dielectric constant is stabilized when the mean particle diameter of the high dielectric constant ceramic is within the range of 1–50 μm, but the dielectric constant is decreased when the mean particle diameter is 0.5 μm, while it is increased when the mean particle diameter is 100 μm.

Further, polybutylene terephthalate and $CaTiO_3$ powder were mixed and the dielectric lens antennas were made. First, these materials were roughly mixed in the ratio by volume of 3:1. After the mixture was melted and kneaded by a biaxial knead-extruding machine, the mixture was pelletized. By using these pellets the dielectric lens 12 having the shape of FIG. 1 was made by an injection molding machine.

Then, by using polybutylene terephthalate a matching layer 14 of 3.5 mm thickness was formed on the dielectric lens 12 surface. The reason why polybutylene terephthalate is used for the matching layer material is that its material has a dielectric constant nearly equal to the square root of the dielectric constant of the dielectric lens body and consideration is given to adhesion with the dielectric lens body.

Figure 2:
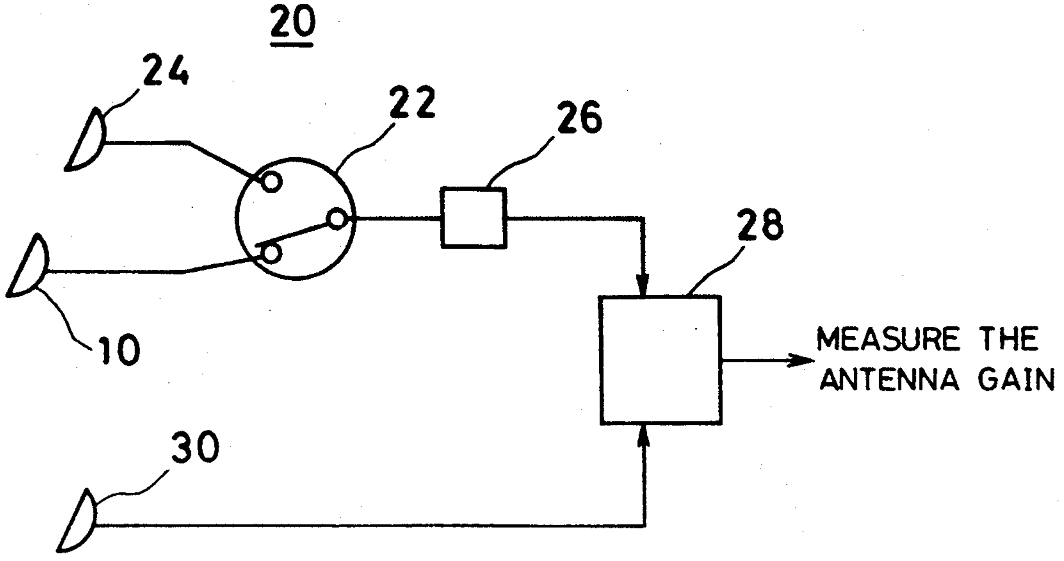
FIG. 2 is an illustrated view showing a measuring instrument for measuring an antenna gain characteristic of a dielectric lens antenna.

The antenna gain of the dielectric lens antenna 10 thus obtained was measured by using the measuring instrument shown in FIG. 2 utilizing waves from communication satellites. At this time the diameter of the dielectric lens antenna was 260 mm.

As a result the antenna gain of the dielectric lens antenna without a matching layer was 24.5 dB, while the antenna gain of the dielectric lens antenna with a matching layer was 27 dB.

As can be seen from these experimental examples, a dielectric lens antenna composite material having a stabilized dielectric constant can be obtained by using the high dielectric constant ceramic having a mean particle diameter of 1–50 μm. Therefore, usage of this dielectric lens antenna composite material having the stabilized dielectric constant can afford a stabilized index of refraction, thereby enabling us to make a dielectric lens antenna having a stabilized antenna characteristic.

In addition it is desirable that a thermoplastic macromolecular material is used as the macromolecular material used for this dielectric lens antenna composite material, and the mechanical quality factor of this thermoplastic macromolecular material is set at a value more than 150. The reason is as follows.

Decrement L of an antenna gain of the dielectric lens antenna is given in the following equation.

$$L=27.3n/Q(n-1)\ (dB)$$

where n denotes a refractive index and Q, a mechanical quality factor. Thus when $n>>1$, $L.\approx 27.3/Q$, and assuming $L\leqq 0.2$ (dB), then $Q\geqq 136$. As can be seen from this, in order to adjust the decrement of the antenna gain to a value less than 0.2 (dB), the mechanical quality factor of more than 150 is required.

Further, in order to improve moldability of the dielectric lens antenna it is preferable that a thermoplastic macromolecular material is used as the macromolecular material.

As an experimental example, $CaTiO_3$ powder and a thermoplastic macromolecular material were mixed to produce the dielectric lens antenna composite materials. The dielectric constant $\epsilon r$ of $CaTiO_3$ used is 180 and its mechanical quality factor Q is 1800. Materials shown in Table 3 were used as the thermoplastic resins, and the $CaTiO_3$ powder and the thermoplastic resin were roughly mixed in a mortar in the ratio by volume of 1:3. This mixture was kneaded by two rolls which were kept at a temperature 10°–20° C. higher than the melting point of the thermoplastic resin. This mixture was cooled and then comminuted and pelletized. Samples for characteristics measurement were made by a compression molding device and the dielectric constants $\epsilon r$ at 12 GHz and the mechanical quality factors Q were measured. The data is shown in Table 3.

In addition, as a comparable example, the thermoplastic resin alone used for the data of Table 3 was molded and its dielectric constant $\epsilon r$ at 12 GHz and the mechanical quality factors Q were measured. The data is shown in Table 4.

As can be seen from Tables 3 and 4, samples using a mixture of $CaTiO_3$ powder and the thermoplastic resin can have higher dielectric constants than that of samples using the thermoplastic resin alone.

Then among the samples using the thermoplastic resin alone and having mechanical quality factor of values more than 150, the polybutylene terephthalate sample was selected and samples having different mixing percent by volume of $CaTiO_3$ powder and polybutylene terephthalate were made and their dielectric characteristics were measured. The data is shown in Table 5. These samples were made in the same manner as that mentioned above.

As can be seen from Table 5, the dielectric constant can be controlled with ease by changing the mixing ratio of $CaTiO_3$ and polybutylene terephthalate.

The dielectric lens antenna was made using $CaTiO_3$ powder and polybutylene terephthalate. First these materials were roughly mixed in the ratio by volume of 1:3. The mixture was melted and kneaded by a biaxial knead-extruding machine and pelletized. Using the pellets the dielectric lens 12 having the shape of FIG. 1 was made by an injection molding machine. Further, using polybutylene terephthalate a matching layer 14 of about 3.5 mm thickness was formed on the dielectric lens surface. The reason why the polybutylene terephthalate was used is that it has a dielectric constant nearly equal to the square root of the dielectric lens's dielectric constant, and consideration is given to adhesion with the dielectric lens body.

The antenna gain of the dielectric lens antenna 10 thus obtained was measured with the measuring instrument of FIG. 2 utilizing waves from communication satellites. The diameter of the dielectric lens antenna was 260 mm.

As a result the antenna gain of the dielectric lens antenna without the matching layer was 24.5 dB, while the antenna gain of the antenna with the matching layer was 27 dB.

As can be seen from these experimental examples, a high dielectric constant and the thermoplastic macromolecular material, and a dielectric constant can be controlled with ease by changing a mixing ratio of these materials. Therefore, when using these dielectric lens antenna composite materials, the same material series can be applied to different kinds of the dielectric antennas.

Further, when using a thermoplastic resin having a superior propagation loss characteristic, the composite material having any mixing ratio shows a superior propagation loss characteristic.

Using these dielectric lens antenna composite material enables us to use the injection molding method and also to simplify manufacturing processes of the dielectric lens antenna as compared with the case of using only the dielectric ceramic, thereby improving yields of materials. In addition because of a simplified molding process, dielectric lens antennas with complex shapes can be produced.

It will be apparent from the foregoing that, while the present invention has been described in detail and illustrated, these are only particular illustrations and examples and the invention is not limited to these. The spirit and scope of the invention is limited only by the appended claims.

TABLE 1

| Sample No. | $CaTiO_3$ (% by volume) | Epoxy resin material (% by volume) | dielectric constant εr |
|---|---|---|---|
| 1 | 0 | 100 | 3 |
| 2 | 13 | 87 | 4.5 |
| 3 | 22 | 78 | 11 |
| 4 | 37 | 63 | 13 |
| 5 | 53 | 47 | 20 |

TABLE 2

| Sample No. | $CaTiO_3$ powder mean particle diameter (μm) | dielectric constant εr |
|---|---|---|
| 1* | 0.5 | 7.3 |
| 2 | 1 | 8.1 |
| 3 | 5 | 8.2 |
| 4 | 10 | 8.1 |
| 5 | about 50 | 8.3 |
| 6 | about 100 | 9.7 |

Mark * is out of the scope of the present invention.

TABLE 3

| sample No. | thermoplastic macromolecular material to be mixed with $CaTiO_3$ powder | dielectric characteristic: dielectric constant εr | dielectric characteristic: mechanical quality factor Q |
|---|---|---|---|
| 1 | polybutylene terephthalate | 7.8 | 210 |
| 2 | polystyrene | 5.7 | 1650 |
| 3 | polypropylene | 6.6 | 120 |
| 4 | polyphenylene sulfide | 9.1 | 420 |
| 5 | polycarbonate | 7.1 | 180 |
| 6 | acrylonitrile, butadien, styrene copolymer | 6.8 | 160 |
| 7 | methylpentene polymer | 4.9 | 370 |
| 8 | polyvinylidene fluoride | 10.5 | 27 |
| 9 | polyacetal | 8.8 | 44 |

TABLE 4

| sample No. | thermoplastic macromolecular material | dielectric characteristic: dielectric constant εr | dielectric characteristic: mechanical quality factor Q |
|---|---|---|---|
| 1 | polybutylene terephthalate | 3.0 | 215 |
| 2 | polystyrene | 2.5 | 1180 |
| 3 | polypropylene | 2.5 | 2649 |
| 4 | polyphenylene sulfide | 3.3 | 514 |
| 5 | polycarbonate | 2.8 | 178 |
| 6 | acrylonitrile, butadien, styrene copolymer | 2.7 | 161 |
| 7 | methylpentene polymer | 2.1 | 5771 |
| 8 | polyvinylidene fluoride | 2.7 | 28 |
| 9 | polyacetal | 2.9 | 36 |

TABLE 5

| sample No. | $CaTiO_3$ powder (% by volume) | polybutylene terephthalate (% by volume) | dielectric characteristic: dielectric constant εr | dielectric characteristic: mechanical quality factor Q |
|---|---|---|---|---|
| 1 | 0 | 100 | 3.0 | 215 |
| 2 | 9 | 91 | 4.7 | 217 |
| 3 | 16 | 84 | 6.4 | 230 |
| 4 | 23 | 77 | 7.9 | 270 |
| 5 | 50 | 50 | 23.0 | 400 |

What is claimed is:

1. A dielectric lens antenna composite material containing 3–70 percent by volume of a high dielectric constant ceramic and 30–97 percent by volume of a thermoplastic ;macromolecular resin material.

2. A dielectric lens antenna composite material according to claim 1, wherein a mean particle diameter of said high dielectric constant ceramic is 1–50 μm.

3. A dielectric lens antenna composite material according to claim 1, wherein a mechanical quality factor of said thermoplastic macromolecular material is more than 150.

4. A dielectric lens antenna formed by injection-molding a composite material containing 3–70 percent by volume of a high dielectric constant ceramic and 30–97 percent by volume of a thermoplastic macromolecular resin material.

5. A dielectric lens antenna according to claim 4, wherein a mean particle diameter of said high dielectric constant ceramic is 1–50 μm.

6. A dielectric lens antenna according to claim 4, wherein a mechanical quality factor of said thermoplastic macromolecular resin material is more than 150.

7. A method of making a dielectric lens antenna comprising the steps of:

providing a mold having a predetermined shape for forming a dielectric lens antenna;

injecting a composite material containing 3–70 percent by volume of a high dielectric constant ceramic and 30–97 percent by volume of a thermoplastic macromolecular resin material into said mold so as to injection-mold said dielectric lens antenna.

8. A dielectric lens antenna according to claim 7, wherein a mean particle diameter of said high dielectric constant ceramic is 1–50 μm.

9. A dielectric lens antenna according to claim 7, wherein a mechanical quality factor of said thermoplastic macromolecular resin material is more than 150.

* * * * *